United States Patent
Song et al.

(10) Patent No.: US 12,489,482 B2
(45) Date of Patent: Dec. 2, 2025

(54) CONTINUOUS TIME LINEAR EQUALIZER AND DEVICE INCLUDING THE SAME

(71) Applicant: Samsung Electronics Co., Ltd., Suwon-si (KR)

(72) Inventors: Hobin Song, Daejeon (KR); Yungeun Nam, Anyang-si (KR); Byeonggyu Park, Hwaseong-si (KR); Jaehyun Park, Seoul (KR); Hajung Park, Suwon-si (KR); Junhan Bae, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 538 days.

(21) Appl. No.: 17/972,869

(22) Filed: Oct. 25, 2022

(65) Prior Publication Data

US 2023/0130236 A1    Apr. 27, 2023

(30) Foreign Application Priority Data

Oct. 26, 2021 (KR) .......................... 10-2021-0144012
Nov. 16, 2021 (KR) .......................... 10-2021-0158040

(51) Int. Cl.
*H04B 1/18* (2006.01)
*H04B 17/21* (2015.01)

(52) U.S. Cl.
CPC .............. *H04B 1/18* (2013.01); *H04B 17/21* (2015.01)

(58) Field of Classification Search
CPC ... H04B 1/06; H04B 1/10; H04B 1/12; H04B 1/16; H04B 1/1638; H04B 1/18; H04B 17/201; H04B 17/21; H04B 17/22; H04B 17/203
See application file for complete search history.

(56) References Cited

U.S. PATENT DOCUMENTS

| | | | |
|---|---|---|---|
| 7,756,197 B1* | 7/2010 | Ferguson | H04L 25/03038 375/224 |
| 8,274,326 B2* | 9/2012 | Boecker | H04L 25/03885 330/261 |
| 9,288,085 B2* | 3/2016 | Bulzacchelli | H04B 1/123 |
| 9,621,176 B2 | 4/2017 | Mishra et al. | |
| 10,075,141 B1 | 9/2018 | Nagulapalli et al. | |

(Continued)

FOREIGN PATENT DOCUMENTS

WO    WO-2015/187307 A1    12/2015

OTHER PUBLICATIONS

Bracamontes-Salazar, Rigoberto et al: "CMOS Amplifier with Self-correction Offset for SerDes Applications", 2015 16th Latin-American Test Symposium (LATS), IEEE, Mar. 25, 2015 (Mar. 25, 2015), pp. 1-4, XP032774703.

(Continued)

*Primary Examiner* — Quochien B Vuong
(74) *Attorney, Agent, or Firm* — Fish & Richardson P.C.

(57) ABSTRACT

A device includes a receiver analog front-end circuit including a path shared by an internal loopback current path and a calibration current path, wherein the receiver analog front-end circuit is configured to perform an internal test using the internal loopback current path while in a test mode, and equalize a first data signal while in a normal mode, the equalizing the first data signal including removing an offset from the first data signal using the calibration current path.

19 Claims, 16 Drawing Sheets

(56) References Cited

U.S. PATENT DOCUMENTS

| | | |
|---|---|---|
| 10,116,470 B2 | 10/2018 | Gu et al. |
| 10,419,250 B1 | 9/2019 | Taylor |
| 10,715,358 B1 | 7/2020 | Zhang et al. |
| 10,763,810 B2 | 9/2020 | Forey et al. |
| 11,038,602 B1 | 6/2021 | Sun et al. |
| 11,476,889 B2 * | 10/2022 | Gangavaram .......... H04B 17/21 |
| 2007/0104111 A1 | 5/2007 | Kakizawa |

OTHER PUBLICATIONS

Nikolaos Terzopoulos et al: "A 5-Gbps USB3.0 transmitter and receiver linear equalizer", International Journal of Circuit Theory and Applications, John Wiley & Sons, Inc, Hoboken, USA, vol. 43, No. 7, Feb. 28, 2014 (Feb. 28, 2014), pp. 900-916, XP071448338.
EP Extended European Search Report for corresponding European Patent Application No. 22203527.1 issued on Feb. 23, 2023.

* cited by examiner

CONTINUOUS TIME LINEAR EQUALIZER AND DEVICE INCLUDING THE SAME

CROSS-REFERENCE TO RELATED APPLICATIONS

This U.S. non-provisional application is based on and claims the benefit of priority under 35 U.S.C. § 119 to Korean Patent Application Nos. 10-2021-0144012, filed on Oct. 26, 2021, and 10-2021-0158040, filed on Nov. 16, 2021, in the Korean Intellectual Property Office, the entire disclosures of each of which are incorporated by reference herein.

BACKGROUND

Various example embodiments of the inventive concepts relate to a continuous time linear equalizer (CTLE), and more particularly, to a CTLE device for performing equalization, a method of operating the CTLE device, and/or a system including the same, etc.

With recent developments of data technology, a huge amount of data needs to be exchanged between devices, and accordingly, interfacing techniques for smooth data exchange are desired and/or demanded. Devices may be connected to each other through a channel transmitting data signals. However, data signals transmitted through a channel may include noise such as intersymbol interference (ISI) due to various causes such as a skin effect and dielectric loss, and accordingly, the quality of the data signals transmitted at high speed may be degraded.

To improve the quality of exchanged data signals, devices may include a CTLE, a decision feedback equalizer (DFE), or the like. A CTLE may support equalization in various modes such as a test mode and a normal mode. Circuit configurations necessary to support various modes may increase the internal capacitance of the CTLE and limit and/or reduce the operating frequency bandwidth of the CTLE.

SUMMARY

Various example embodiments of the inventive concepts provide a continuous time linear equalizer (CTLE) configured to improve an operating frequency bandwidth by decreasing, reducing, and/or minimizing an internal parasitic capacitance when equalization is performed, a method of operating the CTLE, and/or a system including the same.

According to at least one example embodiment of the inventive concepts, there is provided a device including a receiver analog front-end circuit including a path shared by an internal loopback current path and a calibration current path, wherein the receiver analog front-end circuit is configured to perform an internal test using the internal loopback current path while in a test mode, and equalize a first data signal while in a normal mode, the equalizing the first data signal including removing an offset from the first data signal using the calibration current path.

According to at least one example embodiment of the inventive concepts, there is provided a device including a receiver analog front-end circuit configured to equalize a first data signal, a transmitter driver circuit configured to transmit a second data signal to an external destination, a serializer/deserializer (SERDES) circuit configured to parallelize the equalized first data signal provided from the receiver analog front-end circuit, or serialize and provide the second data signal to the transmitter driver circuit, and a controller configured to control the receiver analog front-end circuit and the SERDES circuit to enable one of an internal loopback current path or a calibration current path, wherein the receiver analog front-end circuit is further configured to use the internal loopback current path to test the receiver analog front-end circuit and the SERDES circuit while in a test mode, and use the calibration current path to equalize the first data signal by removing an offset from the first data signal while in a normal mode, and the receiver analog front-end circuit includes a plurality of first transistors corresponding to a path shared between the internal loopback current path and the calibration current path.

According to at least one example embodiment of the inventive concepts, there is provided a CTLE including a high-frequency filter circuit configured to receive a first positive input and a first negative input, and output a positive selection input and a negative selection input based on the first positive input and the first negative input, a fixed gain amplifier circuit configured to receive a second positive input, a second negative input, the positive selection input, and the negative selection input from the high-frequency filter circuit, and a variable gain amplifier circuit configured to receive a third positive input and a third negative input from the fixed gain amplifier circuit, wherein the fixed gain amplifier circuit includes: a first current source configured to amplify the second positive input or the second negative input, a second current source configured to remove an offset from the third positive input and the third negative input, a plurality of first transistors configured to form a first path from the first current source in response to the second positive input or the second negative input, a plurality of second transistors configured to form a second path from the second current source in response to the positive selection input or the negative selection input, a plurality of third transistors configured to generate a third path from the first current source in response to a mode selection signal, and the positive selection input and the negative selection input correspond to internal test data while the CTLE is in a test mode and correspond to offset data while the CTLE is in a normal mode.

According to at least one example embodiment of the inventive concepts, there is provided a receiver analog front-end circuit including a CTLE configured to equalize first data signals; a decision feedback equalizer (DFE) configured to equalize second data signals; a clock recovery circuit configured to recover a clock signal from the equalized first data signals; a summer circuit configured to generate third data signals by summing the equalized first data signals and the equalized second data signals; and a decision circuit configured to generate the second data signals by sampling the third data signals using the clock signal, wherein the CTLE includes a path shared between an internal loopback current path and a calibration current path, and the CTLE is further configured to enable the internal loopback current path for an internal test while in a test mode, and enable the calibration current path and equalize the first data signal by removing an offset from outputs of the CTLE while the CTLE is in a normal mode.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
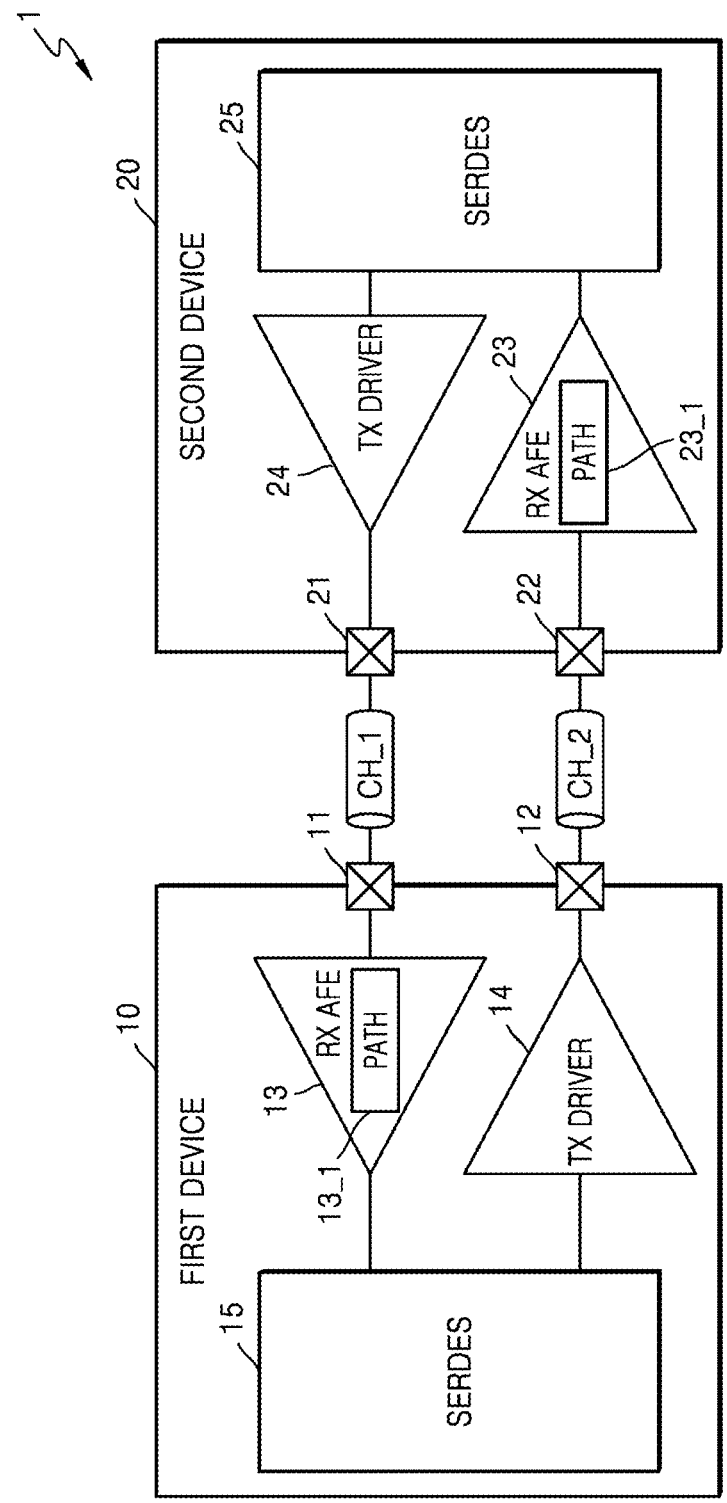
FIG. 1 is a schematic diagram of an electronic system according to at least one example embodiment.

FIG. 1 is a schematic diagram of an electronic system 1 according to at least one example embodiment.

The electronic system 1 may include at least a first device 10 and/or a second device 20, but the example embodiments are not limited thereto, and for example, there may be a greater number of devices, etc. Each of the first and second devices 10 and 20 may be referred to as an electronic device and may include a desktop computer, a laptop computer, a tablet computer, a smartphone, a wearable device, a video game console, an appliance, a medical device, or the like.

However, the example embodiments are not limited thereto. In some example embodiments, the electronic system 1 may be implemented by a single electronic device. In these example embodiments, each of the first and second devices 10 and 20 may correspond to an element or a proprietary (e.g., intellectual property (IP)) device, which is included in the single electronic device, and may be embodied as a circuit, a module, a chip, and/or a package, etc. In some example embodiments, each of the first and second devices 10 and 20 may be embodied as a single circuit, a module, a chip, and/or a package, etc. The terms "system" and "device" are used for clear understanding, and the example embodiments should not be construed as being limited to those terms.

The first device 10 and the second device 20 may communicate with each other and exchange data signals through a plurality of data channels, such as first and second channels CH1 and CH_2, etc., but are not limited thereto. Each of the first and second devices 10 and 20 may include a conductive material (e.g., conductive physical medium, etc.) to transmit data signals. For example, each of the first and second channels CH_1 and CH_2 may include a trace pattern of a printed circuit board (PCB), a conductive wire of a cable, a metal pin or pad of a connector, or the like, but are not limited thereto.

The first device 10 may include a receiving pad 11, a transmitting pad 12, a receiver analog front-end (RX AFE) 13 (e.g., a RX AFE circuit, RX AFE circuitry, etc.), a transmitter (TX) driver 14 (e.g., TX driver circuit, TX driver circuitry, etc.), and/or a serializer/deserializer (SERDES) 15 (e.g., SERDES circuit), etc., but is not limited thereto and may include a greater or lesser number of constituent components. The second device 20 may include a transmitting pad 21, a receiving pad 22, a RX AFE 23, a TX driver 24, and/or a SERDES 25, but is not limited thereto. The desired and/or minimum configuration of the first and second devices 10 and 20 is illustrated in FIG. 1 for the description of some example embodiments. The example embodiments are not limited thereto, and each of the first and second devices 10 and 20 may further include functional circuits (e.g., a controller, a processor, memory, an image sensor, a display, etc.). Here, each of the RX AFEs 13 and 23 may be an example implementation of a receiver, and each of the TX drivers 14 and 24 may be an example implementation of a transmitter, but the example embodiments are not limited thereto. For example, the RX AFE 13 and the TX driver 14 may be combined into an integrated circuit such as a transceiver, and/or the RX AFE 23 and the TX driver 24 may be combined into an integrated circuit such as a transceiver, etc.

Each of the first and second devices 10 and 20 may be implemented as an individual element, an IP (e.g., an IP block, an IP core, an IP device, etc.), and/or an electronic device, etc. In some example embodiments, the first device 10 may be recognized as an external device of the second device 20, and the second device 20 may be recognized as an external device of the first device 10, etc.

The reception of a data signal from the second device 20 by the first device 10 according to at least one example embodiment is described below. The SERDES 25 may serialize a data signal, which is generated by the operations of functional circuits (not shown) of the second device 20. The SERDES 25 may provide the data signal that has been serialized to the TX driver 24, and the TX driver 24 may transmit the data signal to the first device 10 through the transmitting pad 21 and the first channel CH_1. The RX AFE 13 may be coupled to the transmitting pad 11 and may receive the data signal through the transmitting pad 11. The RX AFE 13 may perform equalization on the data signal in a normal mode, e.g., a first mode. In detail, the RX AFE 13 may form a calibration current path, perform equalization on the data signal (e.g., reduce noise, interference, and/or jitter, etc., from the data signal), and/or remove at least one offset between internal outputs thereof, or in other words, the RX AFE 13 may remove the at least one offset from the received data signal and internally output the data signal with the removed offset to the SERDES 15, etc. The RX AFE 13 may transmit the equalized data signal to the SERDES 15. The SERDES 15 may parallelize the equalized data signal and provide the parallelized data signal to functional circuits (not shown) of the first device 10. According to some example embodiments, the calibration current path may be used to remove the offset between and/or from internal outputs of the RX AFE 13 and also may be used for normal equalization by the RX AFE 13, but is not limited thereto.

The RX AFE 13 may perform test equalization on internal test data in a test mode, e.g., a second mode, to check and/or determine whether the RX AFE 13 operates normally. The RX AFE 13 may form an internal loopback current path (e.g., internal feedback loop, etc.) and perform the test equalization on the fed back internal test data.

According to at least one example embodiment, the RX AFE 13 may include a path 13_1 shared between the internal loopback current path and the calibration current path. The path 13_1 may refer to an overlapping path between the internal loopback current path and the calibration current path and/or a path which is capable of being used by both the internal loopback current path and the calibration current path, but the example embodiments are not limited thereto. The path 13_1 may correspond to a part of the internal loopback current path in the test mode and a part of the calibration current path in the normal mode.

The reception of a data signal from the first device 10 by the second device 20 according to at least one example embodiment is described below, but the example embodiments are not limited thereto. The SERDES 15 may serialize a data signal, which is generated by the operations of functional circuits (not shown) of the first device 10. The SERDES 15 may provide the data signal that has been serialized to the TX driver 14, and the TX driver 14 may transmit the data signal to the second device 20 through the transmitting pad 12 and the second channel CH_2. The RX AFE 23 may be coupled to the transmitting pad 22 and may receive the data signal through the transmitting pad 22. Like the RX AFE 13 of the first device 10, the RX AFE 23 may include a path 23_1. The descriptions of the path 13_1 may also apply to the path 23_1, and thus, detailed descriptions thereof are omitted.

According to at least one example embodiment, the RX AFEs 13 and 23 respectively use the paths 13_1 and 23_1 in the test mode and the normal mode, thereby decreasing and/or reducing the number of paths which may cause an increase in (and/or contribute to) the internal capacitance component. The RX AFEs 13 and 23 may improve an operating frequency bandwidth by reducing the internal capacitance component, and thus the RX AFEs may perform smooth equalization and/or improved equalization on data signals having a high data rate. As a result, the performance of the first and second devices 10 and 20 may be enhanced and/or improved, etc.

Figure 2:
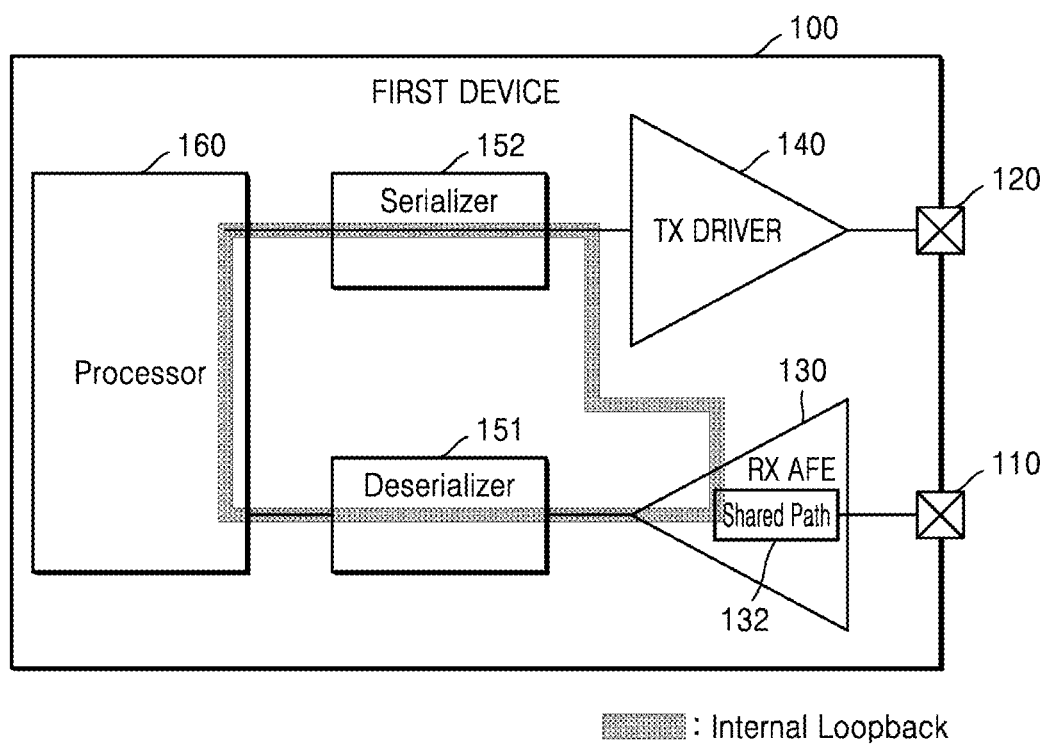
FIG. 2 is a schematic diagram of a first device according to at least one example embodiment.

FIG. 2 is a schematic diagram of a first device 100 according to at least one example embodiment.

Referring to FIG. 2, the first device 100 may include a receiving pad 110, a transmitting pad 120, an RX AFE 130, a TX driver 140, a deserializer 151, a serializer 152, and/or at least one processor 160, etc., but the example embodiments are not limited thereto, and for example, the first device may include a greater or lesser number of constituent components. The deserializer 151 and the serializer 152 may be implemented as a single SERDES, as shown in FIG. 1, but are shown as separate components in FIG. 2 for illustrative purposes.

The at least one processor 160 may generally control operations of the first device 100. In at least one example embodiment, the processor 160 may control the first device 100 to operate in a test mode (e.g., a second mode) or a normal mode (e.g., a first mode). In detail, the processor 160 may control and/or cause an internal loopback current path to be formed (e.g., enabled, set, etc.) in the first device 100 in the test mode and control and/or cause a calibration current path (not shown) to be formed (e.g., enabled, set, etc.) in the first device 100 in the normal mode. Here, the processor 160 may be referred to as a controller controlling the operations of the first device 100. According to some example embodiments, the processor 160 (and/or the controller), etc., may be implemented as processing circuitry. The processing circuitry may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

In at least one example embodiment, the internal loopback current path may pass through the RX AFE 130, the deserializer 151, the processor 160, and/or the serializer 152, etc., but is not limited thereto. In some example embodiments, the TX driver 140 may be deactivated (e.g., not enabled) in the test mode. However, the example embodiments are not limited thereto. The internal loopback current path may pass through circuits and/or blocks to be tested in the first device 100.

In at least one example embodiment, the RX AFE 130 may include a shared path 132. The shared path 132 may be included in the internal loopback current path in the test mode. In the normal mode, the shared path 132 may be included in the calibration current path. This will be described in detail below.

Figure 3:
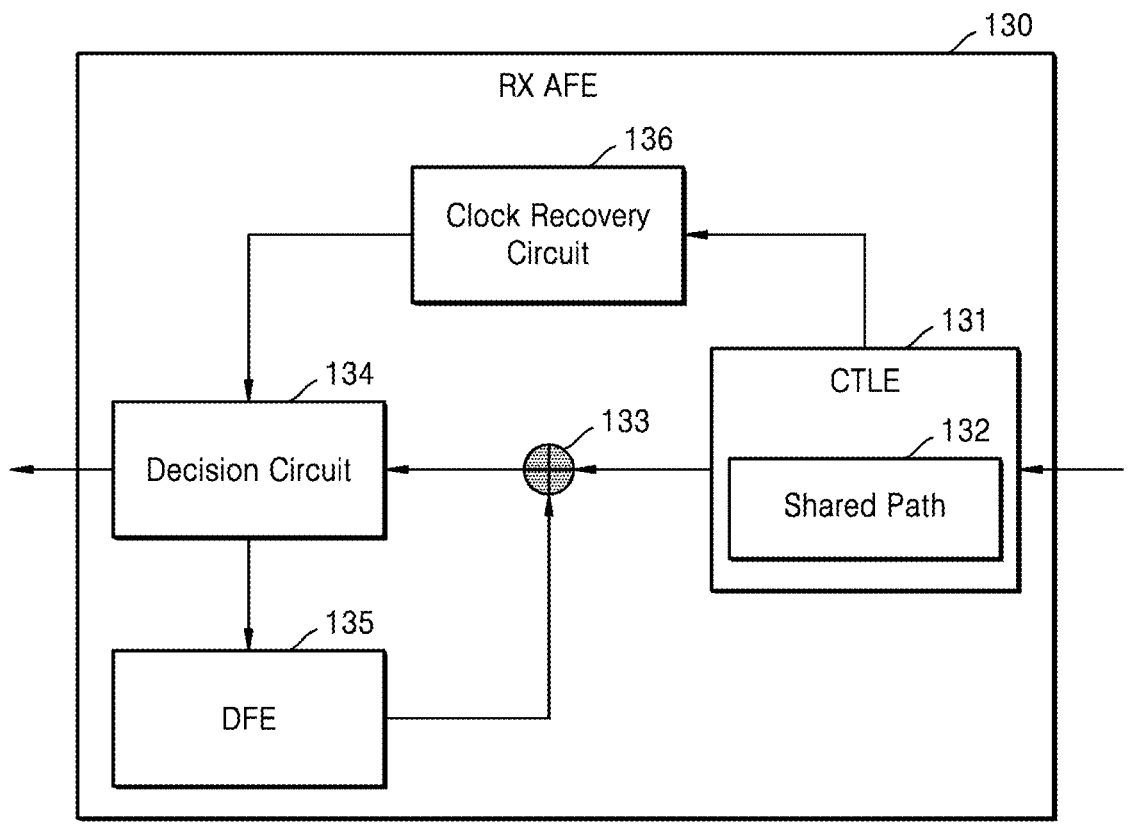
FIG. 3 is a diagram of a receiver analog front-end according at least one example embodiment.

FIG. 3 is a diagram of the RX AFE 130 according to at least one example embodiment.

Referring to FIG. 3, the RX AFE 130 may include a continuous time linear equalizer (CTLE) 131, a summer 133 (e.g., summing circuitry, adder circuitry, etc.), a decision circuit 134, a decision feedback equalizer (DFE) 135, and/or a clock recovery circuit 136, etc., but is not limited thereto.

In at least one example embodiment, the CTLE 131 may include the shared path 132, but is not limited thereto. The shared path 132 may be included in the internal loopback current path when the CTLE 131 is in the test mode, and the shared path 132 may be included in the calibration current path when the CTLE 131 is in the normal mode. The high-frequency component of data signals, which are received by the RX AFE 130 through a channel, may be more attenuated by the influence of the channel than the low-frequency component thereof. Accordingly, to reduce the attenuation of the received data signals, the CTLE 131 may equalize all frequency components of the data signal by amplifying the high-frequency component of the data signals taking into account and/or based on the influence of the channel, etc. For example, the CTLE 131 may include a sample and hold circuit (not shown) and may sample data signals using the sample and hold circuit and perform equalization using the and/or based on the sampling result, but the example embodiments are not limited thereto.

The clock recovery circuit 136 may receive equalized data signals from the CTLE 131 and may recover a clock signal from the equalized data signals. The DFE 135 may perform decision feedback-based equalization on sample data received from the decision circuit 134. The summer 133 may sum up the equalized data signals from the DFE 135 and the equalized data signals from the CTLE 131. The decision circuit 134 may receive the summation result from the summer 133 and the clock signal from the clock recovery circuit 136. The decision circuit 134 may sample the summation result using the clock signal and output the sample data.

In some example embodiments, at least one component selected from the decision circuit 134, the DFE 135, and the clock recovery circuit 136 may include a path corresponding to the shared path 132, or in other words, the shared path 132 may be shared with additional components besides the CTLE 131, etc. However, for the sake of clarity and brevity, the descriptions of the example embodiments below assume that the shared path 132 is included in the CTLE 131, but the example embodiments are not limited thereto.

Figure 4A:
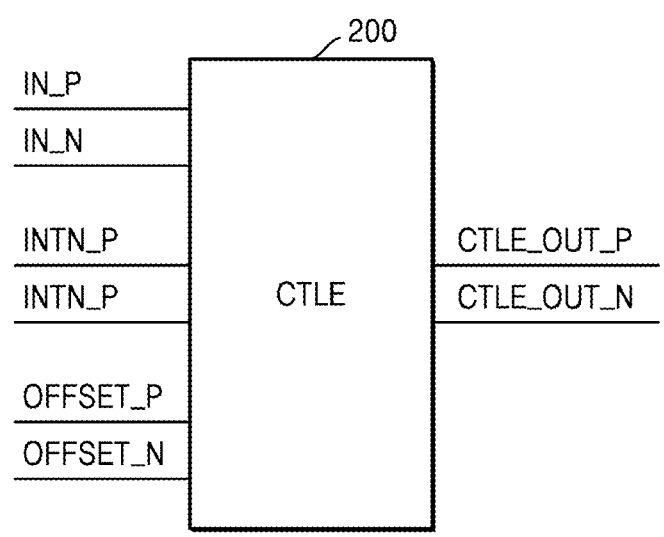
FIG. 4A is a block diagram of a continuous time linear equalizer (CTLE) of a comparative example.
Figure 4B:
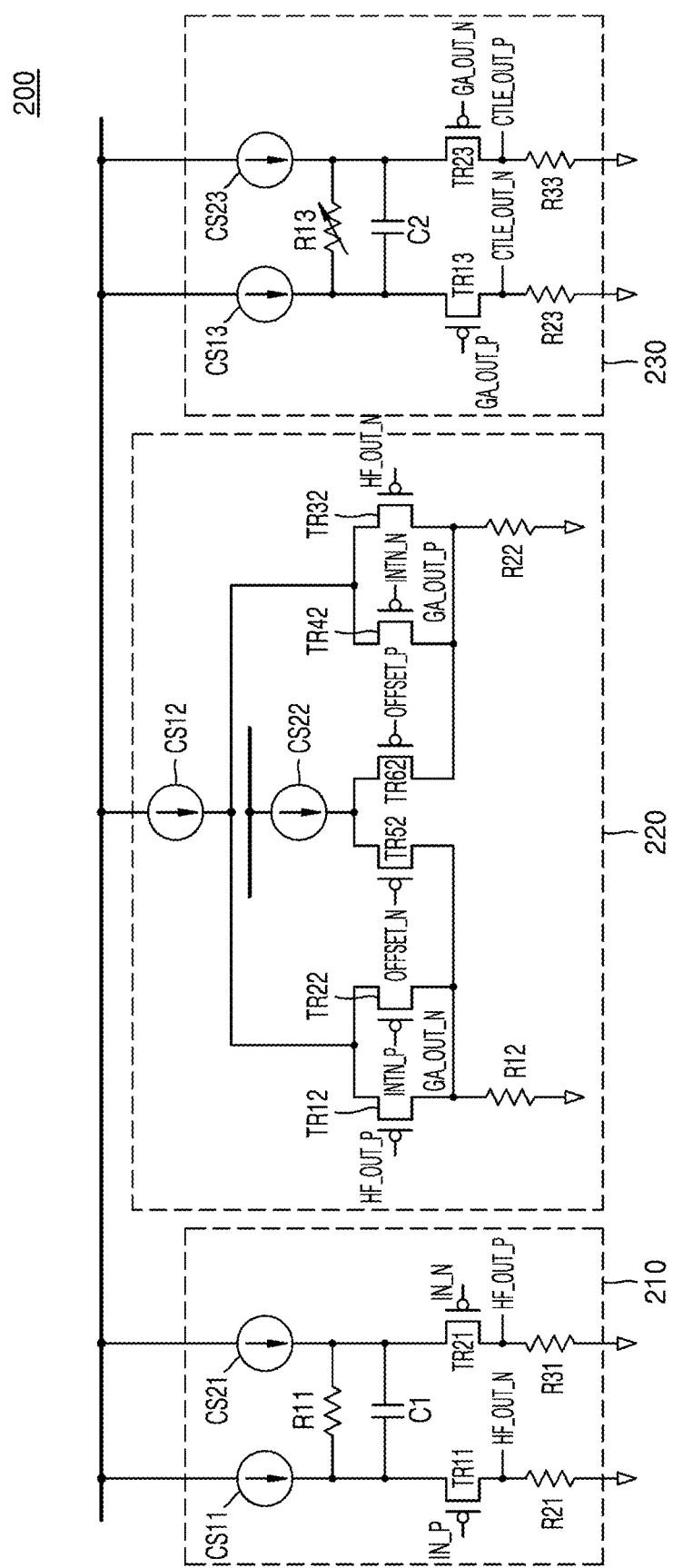
FIG. 4B is a circuit diagram of the CTLE of FIG. 4A according to some example embodiments.

FIG. 4A is a block diagram of a CTLE 200 of a comparative example, and FIG. 4B is a circuit diagram of the CTLE 200 of FIG. 4A.

Referring to FIG. 4A, the CTLE 200 may receive a positive input IN_P, a negative input IN_N, a positive offset OFFSET_P, and/or a negative offset OFFSET_N, etc., in response to the CTLE 200 being in a normal mode. The CTLE 200 may receive a positive internal input INTN_P and a negative internal input INTN_N in response to the CTLE 200 being in a test mode. Here, an internal input provided to the CTLE 200 may be referred to as internal test data, and an offset provided to the CTLE 200 may be referred to as offset data. The positive offset OFFSET_P and the negative offset OFFSET_N may have values which are determined to remove an offset between a positive output CTLE_OUT_P and a negative output CTLE_OUT_N of the CTLE 200.

When in the normal mode, the CTLE 200 may generate the positive output CTLE_OUT_P and the negative output CTLE_OUT_N based on the positive input IN_P, the negative input IN_N, the positive offset OFFSET_P, and the negative offset OFFSET_N. In detail, when in the normal mode, CTLE 200 may perform equalization on the positive input IN_P and the negative input IN_N and remove the offset between the positive output CTLE_OUT_P and the negative output CTLE_OUT_N using the positive offset OFFSET_P and the negative offset OFFSET_N.

When in the test mode, the CTLE 200 may generate the positive output CTLE_OUT_P and the negative output CTLE_OUT_N based on the positive internal input INTN_P and the negative internal input INTN_N. In detail, the positive internal input INTN_P and the negative internal input INTN_N may include a certain and/or desired pattern (e.g., a desired test pattern) to test the CTLE 200, and the CTLE 200 may generate the positive output CTLE_OUT_P and the negative output CTLE_OUT_N by performing test equalization on the positive internal input INTN_P and the negative internal input INTN_N while in the test mode.

Referring further to FIG. 4B, the CTLE 200 may include a high-frequency filter circuit 210, a fixed gain amplifier circuit 220, and/or a variable gain amplifier circuit 230, but the example embodiments are not limited thereto. However, the high-frequency filter circuit 210, the fixed gain amplifier circuit 220, and the variable gain amplifier circuit 230 of the CTLE 200 are not to be limitedly interpreted by their names and may perform other functions. According to at least one example embodiment, the high-frequency filter circuit 210, the fixed gain amplifier circuit 220, and the variable gain amplifier circuit 230 may be respectively referred to as first to third circuits forming a 3-stage structure, but are not limited thereto. Configuration according to some example embodiments described below may be applied to at least one circuit selected from the high-frequency filter circuit 210, the fixed gain amplifier circuit 220, and/or the variable gain amplifier circuit 230, etc. The high-frequency filter circuit 210 may include a first current source CS11, a second current source CS21, a plurality of resistors, e.g., first to third resistors R11, R21, and R31, etc., a first capacitor C1, a first transistor TR11, and/or a second transistor TR21, etc., but is not limited thereto. For example, each of the first transistor TR11 and the second transistor TR21 may include a p-channel metal-oxide-semiconductor field-effect transistor (MOSFET). The first current source CS11 may be connected in parallel to the second current source CS21. The first resistor R11 and the first capacitor C1 may be connected in parallel to each other between an output node of the first current source CS11 and an output node of the second current source CS21. A source node of the first transistor TR11 may be connected to the output node of the first current source CS11, a drain node of the first transistor TR11 may be connected to an end (e.g., a first end) of the second resistor R21, and an opposite end (e.g., a second end) of the second resistor R21 may be grounded. A source node of the second transistor TR21 may be connected to the output node of the second current source CS21, a drain node of the second transistor TR21 may be connected to an end (e.g., a first end) of the third resistor R31, and an opposite end (e.g., a second end) of the third resistor R31 may be grounded.

While in the normal mode (e.g., first mode), the first transistor TR11 may receive the positive input IN_P through a gate thereof, and the second transistor TR21 may receive the negative input IN_N through a gate thereof. While in the normal mode, the high-frequency filter circuit 210 may generate a first negative output HF_OUT_N corresponding to the positive input IN_P and a first positive output HF_OUT_P corresponding to the negative input IN_N.

While in the test mode (e.g., second mode), the high-frequency filter circuit 210 may be deactivated.

The fixed gain amplifier circuit 220 may include a third current source CS12, a fourth current source CS22, third to eighth transistors TR12 to TR62, a fourth resistor R12, and/or a fifth resistor R22. For example, each of the third to eighth transistors TR12 to TR62 may include a p-channel MOSFET. The third current source CS12 may be connected in parallel to the fourth current source CS22. The third to sixth transistors TR12 to TR42 may be connected in parallel to one another at an output node of the third current source CS12. In detail, a source node of each of the third to sixth transistors TR12 to TR42 may be connected to the output node of the third current source CS12, and a drain node of each of the third to sixth transistors TR12 to TR42 may be connected to an end (e.g., a first end) of the fourth resistor R12 or an end (e.g., a first end) of the fifth resistor R22. An opposite end (e.g., a second end) of each of the fourth and fifth resistors R12 and R22 may be grounded. The seventh and eighth transistors TR52 and TR62 may be connected in parallel to each other at an output node of the fourth current source CS22. In detail, a source node of each of the seventh and eighth transistors TR52 and TR62 may be connected to the output node of the fourth current source CS22, and a drain node of each of the seventh and eighth transistors TR52 and TR62 may be connected to the end of the fourth or fifth resistor R12 or R22, etc.

While in the normal mode, the third transistor TR12 may receive the first positive output HF_OUT_P through a gate thereof, and the fifth transistor TR32 may receive the first negative output HF_OUT_N through a gate thereof. While in the normal mode, the seventh transistor TR52 may receive the negative offset OFFSET_N through a gate thereof, and the eighth transistor TR62 may receive the positive offset OFFSET_P through a gate thereof. While in the normal mode, the fourth and sixth transistors TR22 and TR42 may be turned off.

While in the test mode, the third, fifth, seventh, and eighth transistors TR12, TR32, TR52, and TR62 may be turned off. While in the test mode, the fourth transistor TR22 may receive the positive internal input INTN_P through a gate thereof, and the sixth transistor TR42 may receive the negative internal input INTN_N through a gate thereof.

While in the normal mode, the fixed gain amplifier circuit 220 may generate a second negative output GA_OUT_N corresponding to the first positive output HF_OUT_P, and may generate a second positive output GA_OUT_P corresponding to the first negative output HF_OUT_N. While in the test mode, the fixed gain amplifier circuit 220 may generate the second negative output GA_OUT_N corresponding to the positive internal input INTN_P, and may generate the second positive output GA_OUT_P corresponding to the negative internal input INTN_N.

The variable gain amplifier circuit 230 may include a fifth current source CS13, a sixth current source CS23, a variable resistor R13, a sixth resistor R23, a seventh resistor R33, a second capacitor C2, a ninth transistor TR13, and/or a tenth transistor TR23, etc., but is not limited thereto. For example, each of the ninth and tenth transistors TR13 and TR23 may include p-channel MOSFET. The fifth current source CS13 may be connected in parallel to the sixth current source CS23. The variable resistor R13 and the second capacitor C2 may be connected in parallel to each other between an output node of the fifth current source CS13 and an output node of the sixth current source CS23. A source node of the ninth transistor TR13 may be connected to the output node of the fifth current source CS13, and a drain node of the ninth transistor TR13 may be connected to an end (e.g., a first end) of the sixth resistor R23. An opposite end (e.g., a second end) of the sixth resistor R23 may be grounded. A source node of the tenth transistor TR23 may be connected to the output node of the sixth current source CS23, and a drain node of the tenth transistor TR23 may be connected to an end (e.g., a first end) of the seventh resistor R33. An opposite end (e.g., a second end) of the seventh resistor R33 may be grounded.

The ninth transistor TR13 may receive the second positive output GA_OUT_P through a gate thereof, and the tenth transistor TR23 may receive the second negative output GA_OUT_N through a gate thereof. While in the normal mode (e.g., first mode), the variable gain amplifier circuit 230 may generate the positive output CTLE_OUT_P corresponding to the first positive output HF_OUT_P, and may generate the negative output CTLE_OUT_N corresponding to the first negative output HF_OUT_N. While in the test mode (e.g., second mode), the variable gain amplifier circuit 230 may generate the positive output CTLE_OUT_P corresponding to the positive internal input INTN_P, and may generate the negative output CTLE_OUT_N corresponding to the negative internal input INTN_N. The gain of the variable gain amplifier circuit 230 may be adjusted by adjusting the resistance of the variable resistor R13.

In the fixed gain amplifier circuit 220 in the comparative example of FIG. 4B, a plurality of paths connected to a node outputting the second negative output GA_OUT_N may include a path via the third transistor TR12, a path via the fourth transistor TR22, and/or a path via the seventh transistor TR52, etc.; and a plurality of paths connected to a node outputting the second positive output GA_OUT_P may include a path via the fifth transistor TR32, a path via the sixth transistor TR42, and/or a path via the eighth transistor TR62, etc. Regardless of the activation or deactivation of these paths, the increase in the number of paths may cause the magnitude of an internal capacitance component of the fixed gain amplifier circuit 220 to increase and may influence the total internal capacitance component of the CTLE 200.

According to at least one example embodiment, a fixed gain amplifier circuit to be described below may reduce the magnitude of the internal capacitance component of the fixed gain amplifier circuit (and/or a CTLE), compared to the comparative examples of FIGS. 4A and 4B, by decreasing the number of paths connected to a node outputting the second positive output GA_OUT_P or a node outputting the second negative output GA_OUT_N to support the test mode and the normal mode.

Figure 5A:
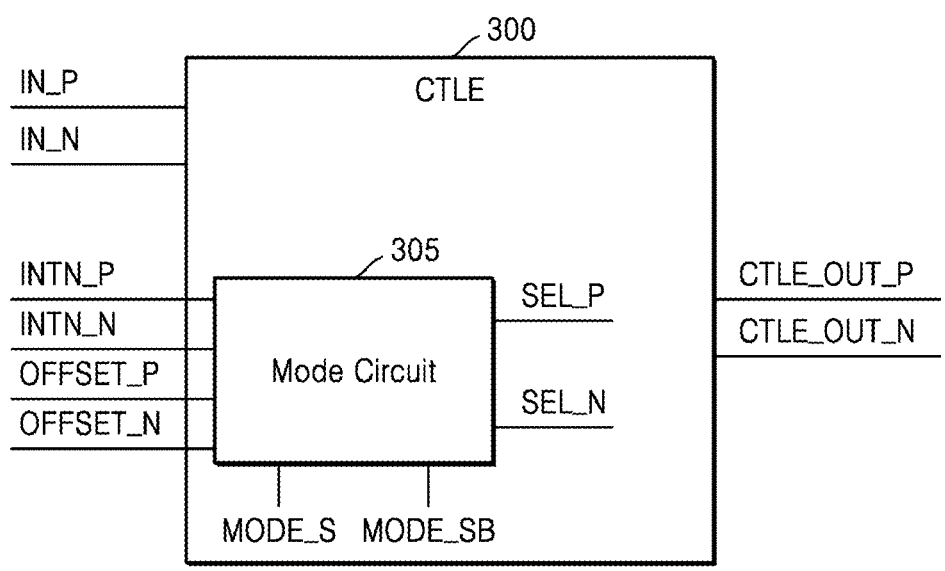
FIG. 5A is a block diagram of a CTLE according to at least one example embodiment.
Figure 5B:
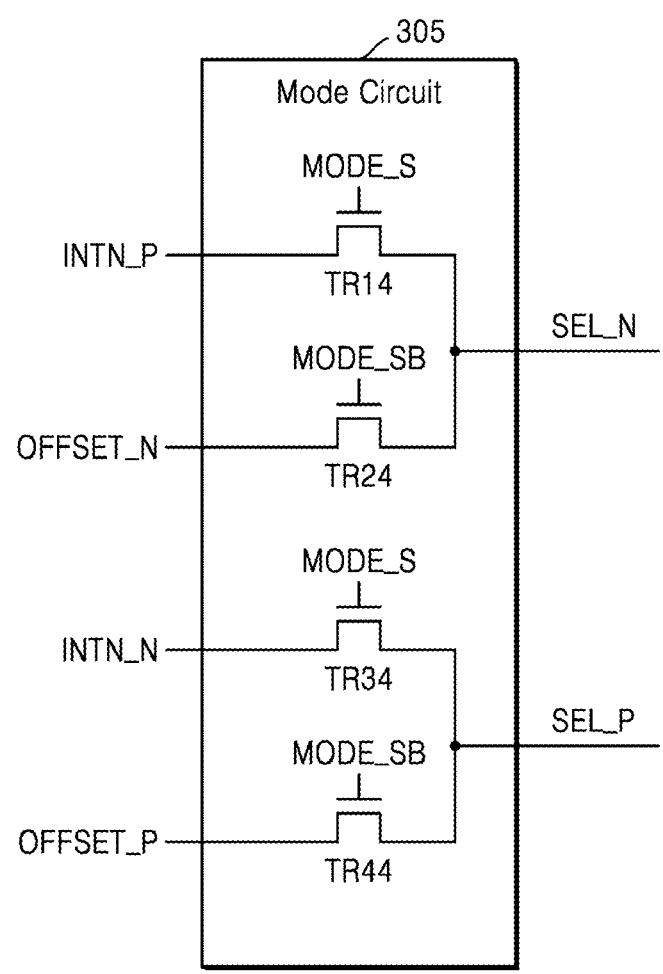
FIG. 5B is a circuit diagram of a mode circuit in FIG. 5A according to some example embodiments.
Figure 5C:
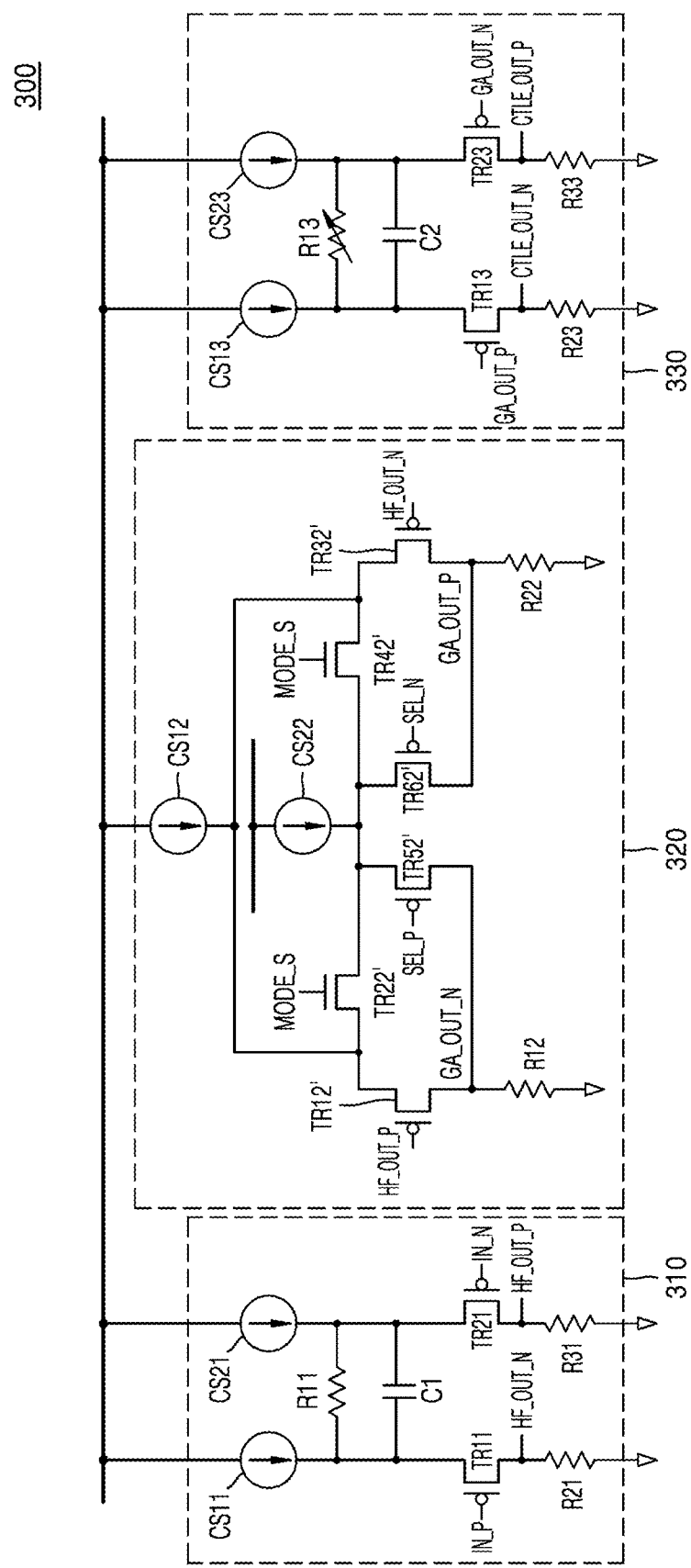
FIG. 5C is a circuit diagram of the CTLE of FIG. 5A according to some example embodiments.

FIG. 5A is a block diagram of a CTLE 300 according to at least one example embodiment. FIG. 5B is a circuit diagram of a mode circuit 305 in FIG. 5A according to at least one example embodiment. FIG. 5C is a circuit diagram of the CTLE 300 of FIG. 5A according to at least one example embodiment.

Referring to FIG. 5A, the CTLE 300 may include a mode circuit 305. In a normal mode (e.g., a first mode), the CTLE 300 may receive the positive input IN_P, the negative input IN_N, the positive offset OFFSET_P, and/or the negative offset OFFSET_N, but is not limited thereto. In a test mode (e.g., a second mode), the CTLE 300 may receive the positive internal input INTN_P and/or the negative internal input INTN_N, but is not limited thereto.

In at least one example embodiment, the mode circuit 305 may select at least one and/or some of the positive internal input INTN_P, the negative internal input INTN_N, the positive offset OFFSET_P, and/or the negative offset OFFSET_N as a positive selection input SEL_P and/or a negative selection input SEL_N, based on a mode selection signal MODE_S and/or an inverted mode selection signal MODE_SB, and output the positive selection input SEL_P and/or the negative selection input SEL_N to the inside of the CTLE 300, but the example embodiments are not limited thereto.

For example, the mode circuit 305 may select and output the positive internal input INTN_P and the negative internal input INTN_N as the positive selection input SEL_P and the negative selection input SEL_N, respectively, in response to the mode selection signal MODE_S and the inverted mode selection signal MODE_SB having values indicating the test mode. The mode circuit 305 may select and output the positive offset OFFSET_P and the negative offset OFFSET_N as the positive selection input SEL_P and the negative selection input SEL_N, respectively, in response to the mode selection signal MODE_S and the inverted mode selection signal MODE_SB having values indicating the normal mode.

Referring further to FIG. 5B, the mode circuit 305 may include eleventh to fourteenth transistors TR14 to TR44, but is not limited thereto. Each of the eleventh to fourteenth transistors TR14 to TR44 may include n-channel MOSFET, but the example embodiments are not limited thereto. For example, the eleventh transistor TR14 may selectively output the positive internal input INTN_P as the negative selection input SEL_N in response to the mode selection signal MODE_S, and the twelfth transistor TR24 may selectively output the negative offset OFFSET_N as the negative selection input SEL_N in response to the inverted mode selection signal MODE_SB, etc.

The thirteenth transistor TR34 may selectively output the negative internal input INTN_N as the positive selection input SEL_P in response to the mode selection signal MODE_S, and the fourteenth transistor TR44 may selectively output the positive offset OFFSET_P as the positive selection input SEL_P in response to the inverted mode selection signal MODE_SB, etc.

In other words, the mode circuit 305 may selectively output an appropriate input according to and/or based on the operation mode of the CTLE 300. However, the mode circuit 305 of FIG. 5B is just an example, and the example embodiments are not limited thereto. The mode circuit 305 may be variously embodied according to the number of operation modes of the CTLE 300, the number of types of inputs received by the mode circuit 305, or the like.

Referring further to FIG. 5C, the CTLE 300 may include a high-frequency filter circuit 310, a fixed gain amplifier circuit 320, and/or a variable gain amplifier circuit 330, etc., but is not limited thereto. Descriptions below are focused on at least one example embodiment where the fixed gain amplifier circuit 320 has a different structure than the fixed gain amplifier circuit 220 of the CTLE 200 of FIG. 4B.

The fixed gain amplifier circuit 320 may include the third current source CS12, the fourth current source CS22, third to eighth transistors TR12' to TR62', the fourth resistor R12, and/or the fifth resistor R22, etc., but is not limited thereto. Here, the third current source CS12 may be used to amplify the first positive output HF_OUT_P and the first negative output HF_OUT_N, and the fourth current source CS22 may be used to remove an offset between the second positive output GA_OUT_P and the second negative output GA_OUT_N (and/or an offset between the positive output CTLE_OUT_P and the negative output CTLE_OUT_N), etc., but the example embodiments are not limited thereto.

For example, each of the third, fifth, seventh, and eighth transistors TR12', TR32', TR52', and TR62' may include a p-channel MOSFET, and each of the fourth and sixth transistors TR22' and TR42' may include an n-channel MOSFET, but the example embodiments are not limited thereto. The third current source CS12 may be connected in parallel to the fourth current source CS22. The third transistor TR12' may be connected in parallel to the fourth and seventh transistors TR22' and TR52', which are connected in series to each other. In detail, a source node of the third transistor TR12' may be connected to the output node of the third current source CS12, and a drain node of the fourth transistor TR22' may be connected to the output node of the third current source CS12. A source node of the seventh transistor TR52' may be connected to a source node of the fourth transistor TR22' and the output node of the fourth current source CS22. A drain node of each of the third and seventh transistors TR12' and TR52' may be connected to the end (e.g., first end) of the fourth resistor R12, and the opposite end (e.g., second end) of the fourth resistor R12 may be grounded, etc.

The fifth transistor TR32' may be connected in parallel to the sixth and eighth transistors TR42' and TR62', which are connected in series to each other. In detail, a source node of the fifth transistor TR32' may be connected to the output node of the third current source CS12, and a drain node of the sixth transistor TR42' may be connected to the output node of the third current source CS12. A source node of the eighth transistor TR62' may be connected to a source node of the sixth transistor TR42' and the output node of the fourth current source CS22. A drain node of each of the fifth and eighth transistors TR32' and TR62' may be connected to the end (e.g., first end) of the fifth resistor R22, and the opposite end (e.g., second end) of the fifth resistor R22 may be grounded, etc.

In the normal mode (e.g., first mode), the third transistor TR12' may receive the first positive output HF_OUT_P through a gate thereof, and the fifth transistor TR32' may receive the first negative output HF_OUT_N through a gate thereof. In the normal mode, the seventh transistor TR52' may receive the positive selection input SEL_P through a gate thereof, and the eighth transistor TR62' may receive the negative selection input SEL_N through a gate thereof. At this time, the positive selection input SEL_P may correspond to the positive offset OFFSET_P in FIG. 5B, and the negative selection input SEL_N may correspond to the negative offset OFFSET_N in FIG. 5B, but the example embodiments are not limited thereto. In the normal mode, each of the fourth and sixth transistors TR22' and TR42' may receive the mode selection signal MODE_S through a gate thereof, and may be turned off in response to the mode selection signal MODE_S, etc.

In the test mode (e.g., second mode), the third and fifth transistors TR12' and TR32' may be turned off. In the test mode, the seventh transistor TR52' may receive the positive selection input SEL_P through the gate thereof, and the eighth transistor TR62' may receive the negative selection input SEL_N through the gate thereof. At this time, the positive selection input SEL_P may correspond to the negative internal input INTN_N in FIG. 5B, and the negative selection input SEL_N may correspond to the positive internal input INTN_P in FIG. 5B, but the example embodiments are not limited thereto. In the test mode, each of the fourth and sixth transistors TR22' and TR42' may receive the mode selection signal MODE_S through the gate thereof and be turned on in response to the mode selection signal MODE_S.

In the normal mode, the fixed gain amplifier circuit 320 may generate the second negative output GA_OUT_N corresponding to the first positive output HF_OUT_P and/or the second positive output GA_OUT_P corresponding to the first negative output HF_OUT_N, etc. In the test mode, the fixed gain amplifier circuit 320 may generate the second negative output GA_OUT_N corresponding to the positive internal input INTN_P and/or the second positive output GA_OUT_P corresponding to the negative internal input INTN_N, etc.

According to at least one example embodiment, the fixed gain amplifier circuit 320 uses paths including the seventh and eighth transistors TR52' and TR62' in both the test mode and the normal mode, compared to FIG. 4B, and accordingly, the number of paths connected to a node outputting the second positive output GA_OUT_P and/or the second negative output GA_OUT_N may be reduced. Accordingly, the internal capacitance of the CTLE 300 may be less than that of the CTLE 200 of FIG. 4B. As a result, the operating frequency bandwidth of the CTLE 300 may be improved and/or increased, and the performance and/or equalization of the output data signals of the CTLE 300 may also be improved, etc.

The at least one example embodiment of CTLE 300 as shown in FIG. 5C is just an example, and the example embodiments are not limited thereto. Various example embodiments for decreasing the number of desired and/or necessary paths in the CTLE 300 by using a shared path in a plurality of modes may be applicable.

Figure 6A:
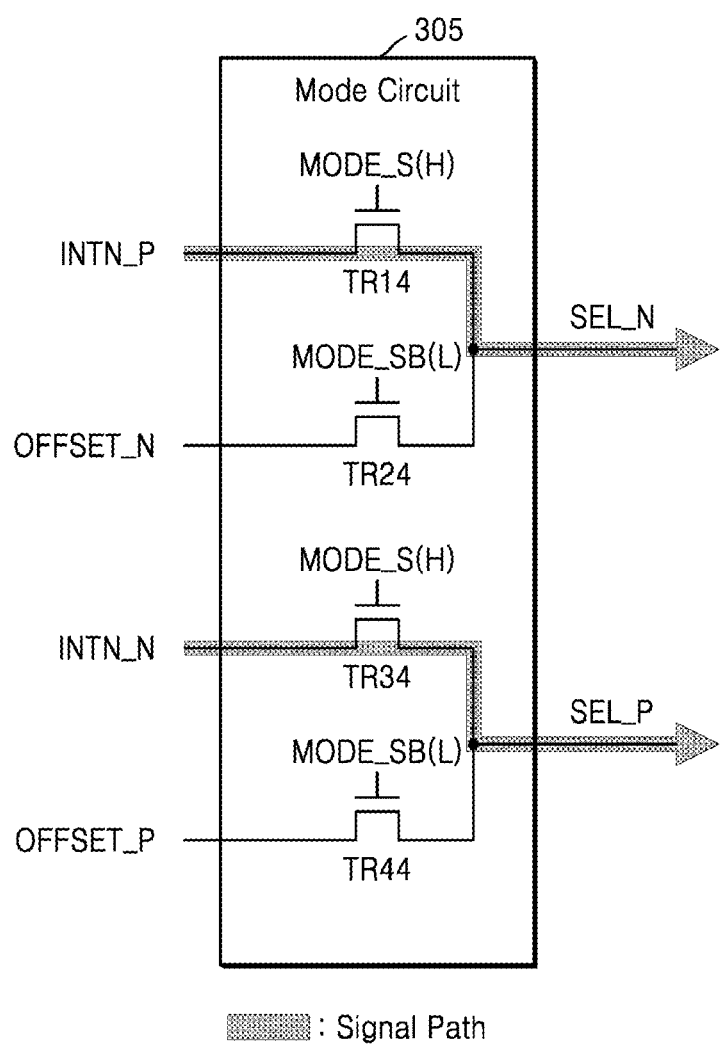
FIGS. 6A and 6B are circuit diagrams for describing operations of a mode circuit and a CTLE in a test mode, according to at least one example embodiment.
Figure 6B:
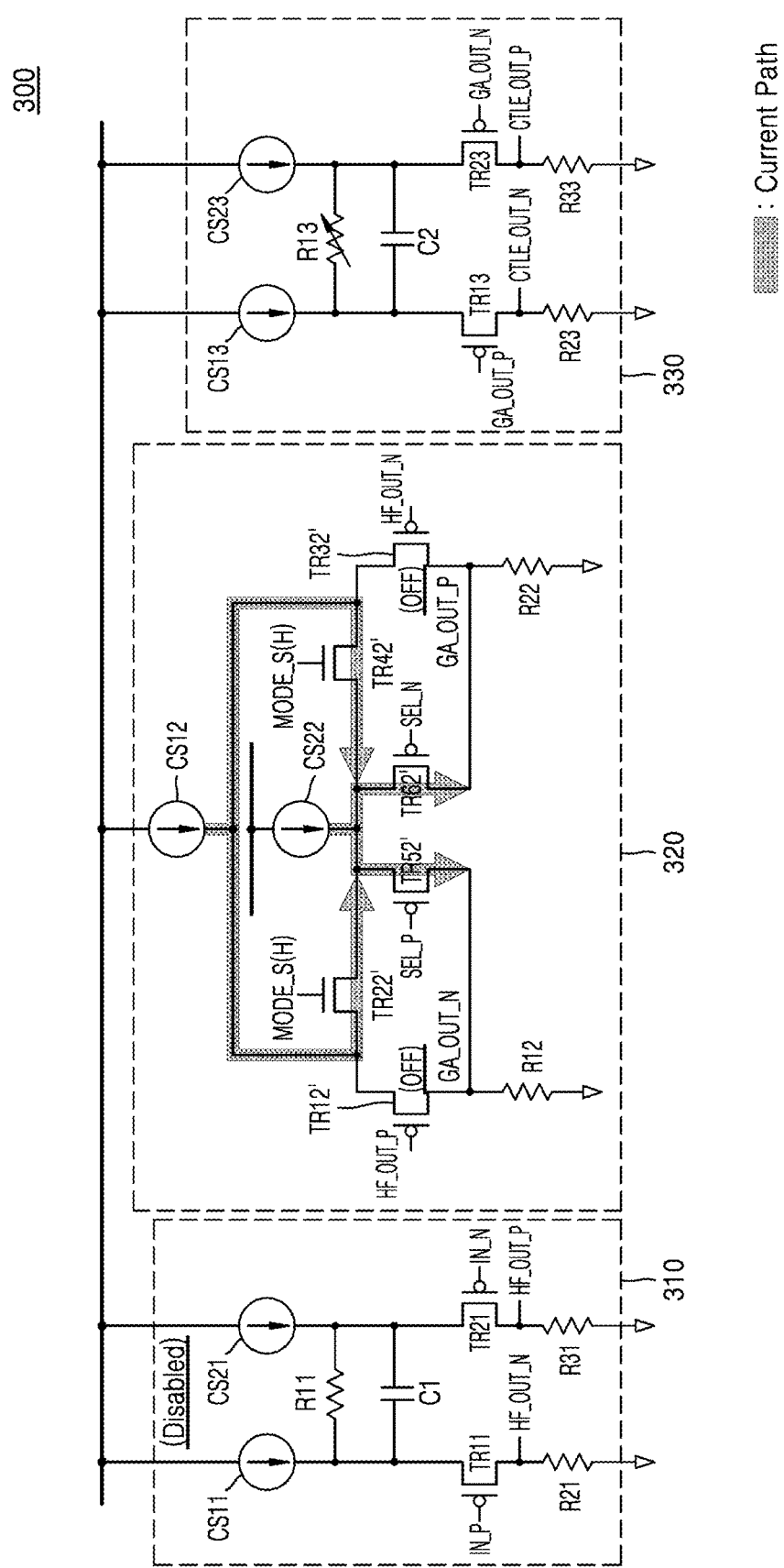

FIGS. 6A and 6B are circuit diagrams for describing operations of the mode circuit 305 and the CTLE 300 in the test mode, according to at least one example embodiment. The configuration of the mode circuit 305 has been described above in connection with FIG. 5B, and thus, redundant and/or duplicative descriptions of the mode circuit 305 are omitted.

Referring to FIG. 6A, in the test mode, the mode circuit 305 may receive the mode selection signal MODE_S at a high level H (e.g., a desired high level, a desired high voltage level, etc.) and the inverted mode selection signal MODE_SB at a low level L (e.g., a desired low level, a desired low voltage level, etc.), but the example embodiments are not limited thereto. The eleventh transistor TR14 may be turned on in response to the mode selection signal MODE_S, and may output the positive internal input INTN_P as the negative selection input SEL_N. The twelfth transistor TR24 may be turned off in response to the inverted mode selection signal MODE_SB. The thirteenth transistor TR34 may be turned on in response to the mode selection signal MODE_S, and may output the negative internal input INTN_N as the positive selection input SEL_P. The fourteenth transistor TR44 may be turned off in response to the inverted mode selection signal MODE_SB.

Referring to FIG. 6B, the high-frequency filter circuit 310 may be deactivated, and the third and fifth transistors TR12' and TR32' of the fixed gain amplifier circuit 320 may be turned off. The fourth and sixth transistors TR22' and TR42' may be turned on in response to the mode selection signal MODE_S at the high level. A first current from the third current source CS12 may flow and/or be transmitted to the seventh transistor TR52' through the fourth transistor TR22'. The first current and a second current from the fourth current source CS22 may be summed up (e.g., added, etc.) at the source of the seventh transistor TR52' and may flow and/or be transmitted through the seventh transistor TR52'. In other words, the first current and second current may be summed up and flow and/or be transmitted through a shared path including the seventh transistor TR52'. The positive selection input SEL_P input to the gate of the seventh transistor TR52' may correspond to the negative internal input INTN_N. Here, a path via the third transistor TR12' and/or the fifth transistor TR32' may be referred to as a first path, a path via the seventh transistor TR52' and/or the eighth transistor TR62' may be referred to as a second path, and a path via the fourth transistor TR22' and/or the sixth transistor TR42' may be referred to as a third path, but the example embodiments are not limited thereto.

The first current from the third current source CS12 may flow and/or be transmitted to the eighth transistor TR62' through the sixth transistor TR42'. The first current and the second current from the fourth current source CS22 may be summed up at the source of the eighth transistor TR62' and flow and/or be transmitted through the eighth transistor TR62'. In other words, the first current and second current may be summed up and may flow and/or be transmitted through a shared path including the eighth transistor TR62'. The negative selection input SEL_N input to the gate of the eighth transistor TR62' may correspond to the positive internal input INTN_P, but is not limited thereto. A current path, through which each of the first current and the second current flow in FIG. 6B, may correspond to an internal loopback current path (e.g., an internal feedback loop, etc.). In other words, the internal loopback current path may include the second and third paths, but the example embodiments are not limited thereto.

As described below with reference to FIGS. 7A and 7B according to at least one example embodiment, a shared path including the seventh and eighth transistors TR52' and TR62' may also be used as a calibration current path in the normal mode, but the example embodiments are not limited thereto.

Figure 7A:
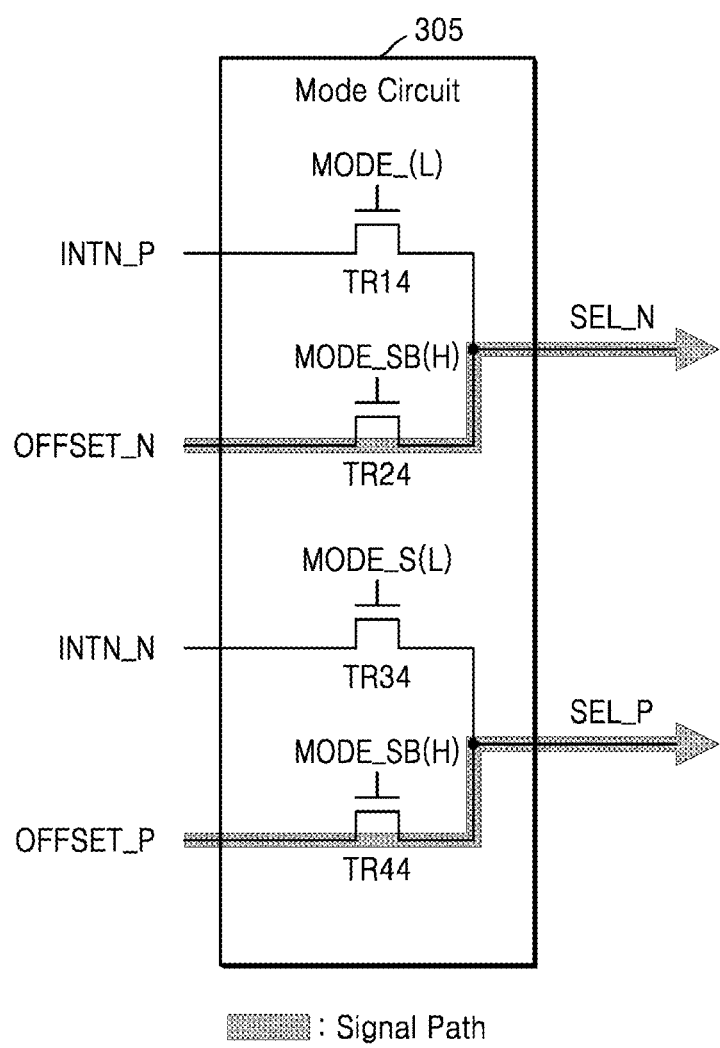
FIGS. 7A and 7B are circuit diagrams for describing operations of a mode circuit and a CTLE in a normal mode, according to at least one example embodiment.
Figure 7B:
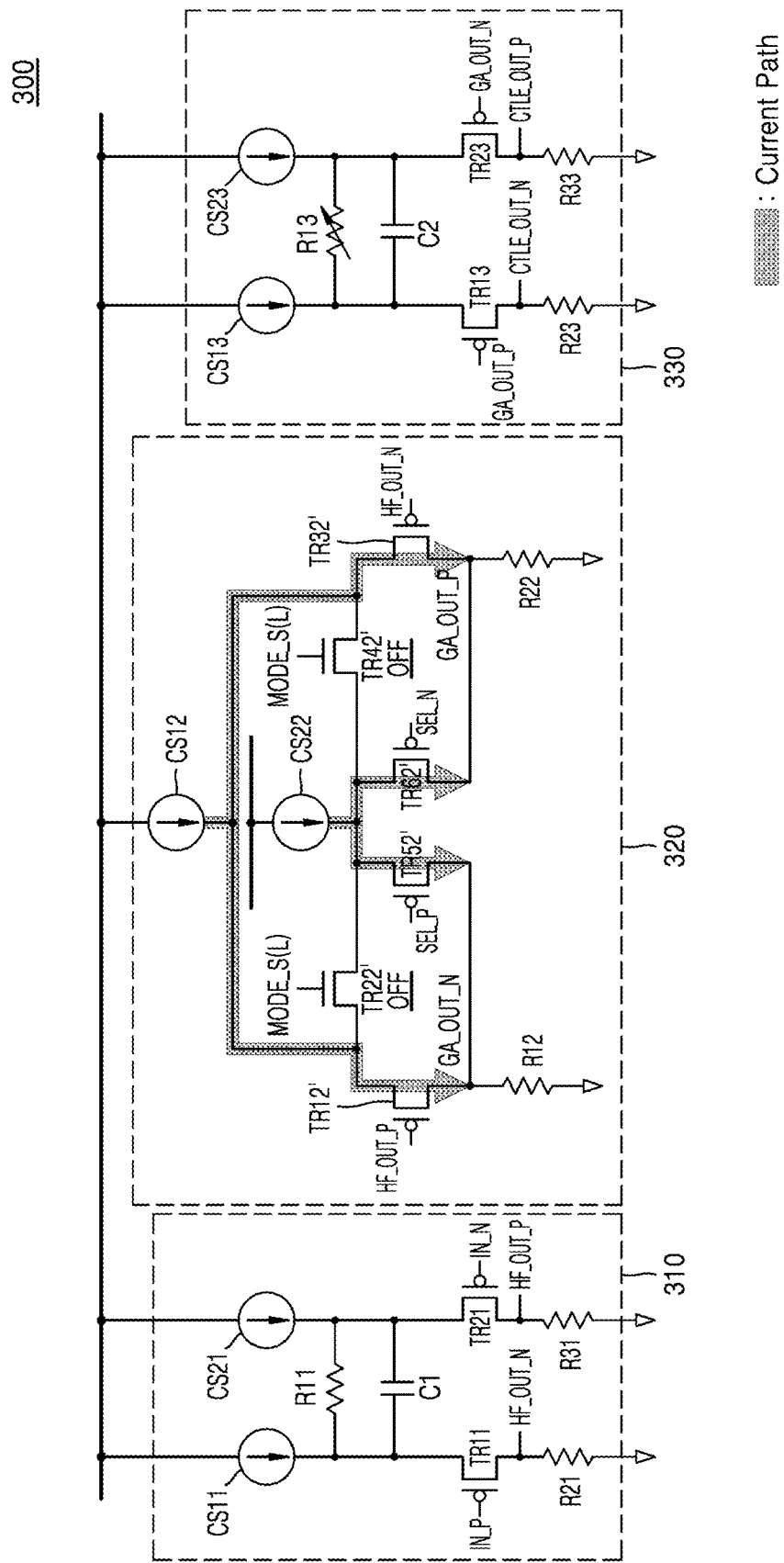

FIGS. 7A and 7B are circuit diagrams for describing operations of the mode circuit 305 and the CTLE 300 in the normal mode, according to at least one example embodiment.

Referring to FIG. 7A, in the normal mode (e.g., the first mode), the mode circuit 305 may receive the mode selection signal MODE_S at a low level L (e.g., the desired low voltage level, etc.) and the inverted mode selection signal MODE_SB at a high level H (e.g., the desired high voltage level, etc.). The eleventh transistor TR14 may be turned off in response to the mode selection signal MODE_S. The twelfth transistor TR24 may be turned on in response to the inverted mode selection signal MODE_SB and may output the negative offset OFFSET_N as the negative selection input SEL_N. The thirteenth transistor TR34 may be turned off in response to the mode selection signal MODE_S. The fourteenth transistor TR44 may be turned on in response to the inverted mode selection signal MODE_SB and may output the positive offset OFFSET_P as the positive selection input SEL_P.

Referring to FIG. 7B, the high-frequency filter circuit 310 may be activated (e.g., turned on, etc.), and the fourth and sixth transistors TR22' and TR42' of the fixed gain amplifier circuit 320 may be turned off in response to the mode selection signal MODE_S at the low level L. The first current from the third current source CS12 may flow and/or be transmitted through the third transistor TR12'. The second current from the fourth current source CS22 may flow and/or be transmitted through the seventh transistor TR52'. In other words, only the second current may flow through a shared path including the seventh transistor TR52', but the example embodiments are not limited thereto. The positive selection input SEL_P input to the gate of the seventh transistor TR52' may correspond to the positive offset OFFSET_P. The second negative output GA_OUT_N may be generated by summing a result of amplifying the first positive output HF_OUT_P using the third transistor TR12' and a result of amplifying the positive offset OFFSET_P using the seventh transistor TR52', but the example embodiments are not limited thereto.

The first current from the third current source CS12 may flow and/or be transmitted through the fifth transistor TR32'. The second current from the fourth current source CS22 may flow and/or be transmitted through the eighth transistor TR62'. In other words, only the second current may flow through a shared path including the eighth transistor TR62', but the example embodiments are not limited thereto. The negative selection input SEL_N input to the gate of the eighth transistor TR62' may correspond to the negative offset OFFSET_N. The second positive output GA_OUT_P may be generated by summing a result of the amplified first negative output HF_OUT_N using the fifth transistor TR32' and a result of the amplified negative offset OFFSET_N using the eighth transistor TR62', but the example embodiments are not limited thereto. In FIG. 7B, according to at least one example embodiment, a current path, through which each of the first and second currents flows and/or is transmitted, may correspond to a calibration current path. In other words, the calibration current path may include the first and second paths, but the example embodiments are not limited thereto.

Figure 8:
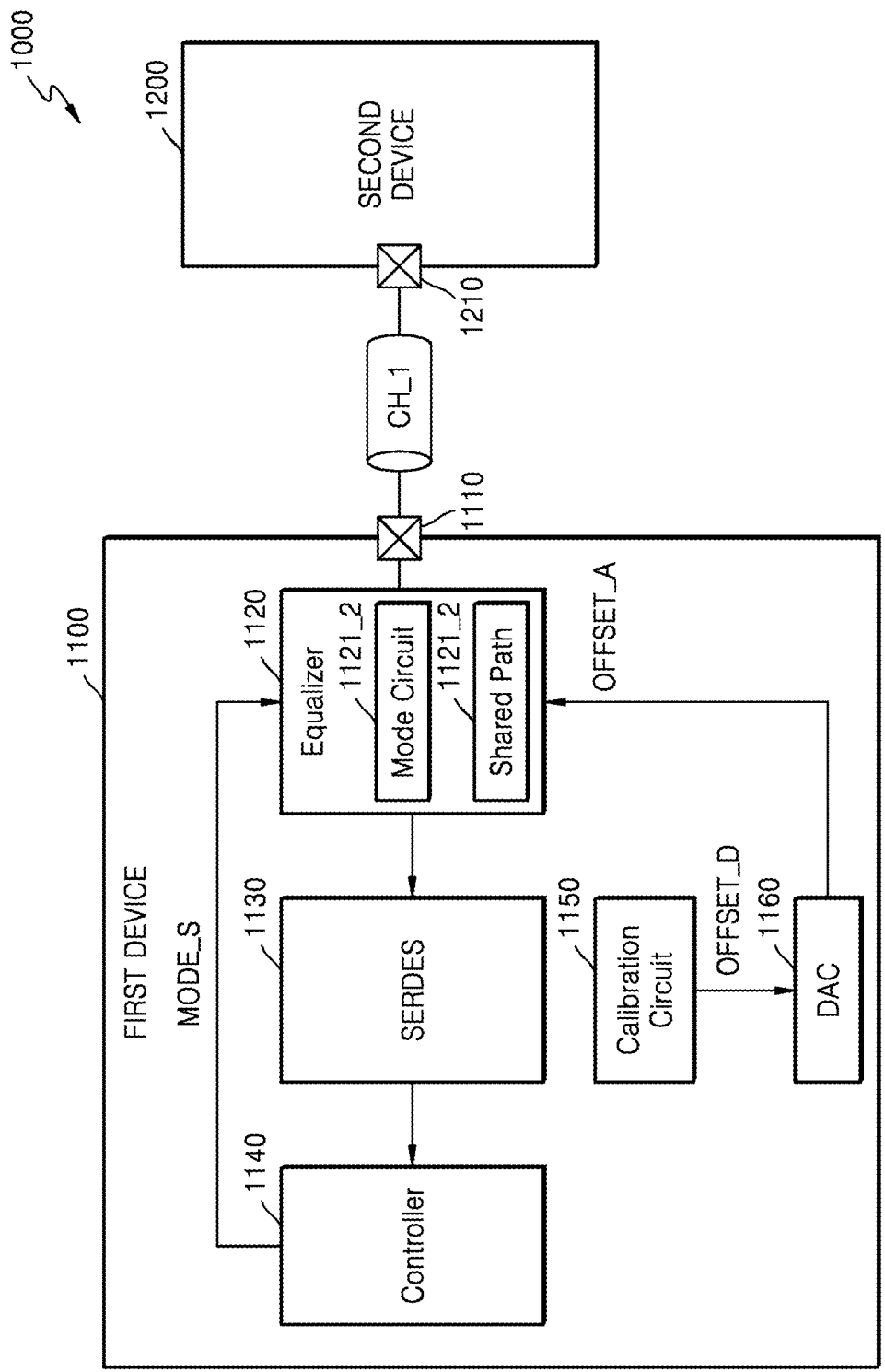
FIG. 8 is a block diagram of an electronic system according to at least one example embodiment.

FIG. 8 is a block diagram of an electronic system 1000 according to at least one example embodiment.

Referring to FIG. 8, according to at least one example embodiment, the electronic system 1000 may include at least a first channel CH_1 and a plurality of devices, such as first and second devices 1100 and 1200, etc., but the example embodiments are not limited thereto, and for example, may include a greater or lesser number of constituent components, etc. The first device 1100 may include a receiving pad 1110, an equalizer 1120 (e.g., an equalizer circuit, etc.), a SERDES 1130 (e.g., a SERDES circuit, etc.), a controller 1140, a calibration circuit 1150, and/or a digital-to-analog converter (DAC) 1160, etc., but is not limited thereto. According to at least one example embodiment, the equalizer 1120 may include a mode circuit 1121 and a shared path 1122, etc., but is not limited thereto. According to at least one example embodiment, the equalizer 1120 may include a CTLE, a DFE, or the like.

According to at least one example embodiment, the controller 1140 may control operations of the first device 1100, and for example, control the first device 1100 to operate in a normal mode (e.g., a first mode) or a test mode (e.g., a second mode), etc., but is not limited thereto. For example, the controller 1140 may control the formation, enablement, configuration, and/or the activation of an internal loopback current path to test the states of the equalizer 1120 and/or the SERDES 1130 in the test mode. The controller 1140 may control the formation, enablement, configuration, and/or activation of a calibration current path to allow the equalizer 1120 to perform equalization of signals input to the equalizer 1120 in the normal mode. In detail, the controller 1140 may control the formation of the internal loopback current path and/or the calibration current path by generating and providing the mode selection signal MODE_S to the mode circuit 1121, etc., but is not limited thereto.

In at least one example embodiment, while in the normal mode, the calibration circuit 1150 may sense the voltages of outputs of the equalizer 1120 and may generate digital offset data OFFSET_D based on the sensing result. The digital offset data OFFSET_D may be used to remove at least one offset between and/or from the outputs of the equalizer 1120. For example, the DAC 1160 may generate analog offset data OFFSET_A by performing digital-to-analog conversion on the digital offset data OFFSET_D received from the calibration circuit 1150. In the normal mode, the equalizer 1120 may remove an offset between and/or from the outputs of the equalizer 1120 based on the analog offset data OFFSET_A, etc.

In at least one example embodiment, the shared path 1122 may be used as the internal loopback current path in the test mode and as the calibration current path in the normal mode. In other words, the shared path 1122 is used as a current path multiple times in multiple modes, and accordingly, the number of paths used for the equalizer 1120 may be decreased.

Figure 9:
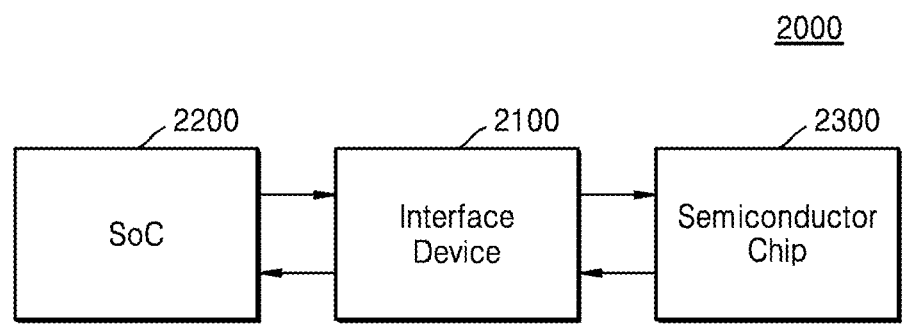
FIGS. 9 and 10 are diagrams for describing an electronic system according to some example embodiments.
Figure 10:
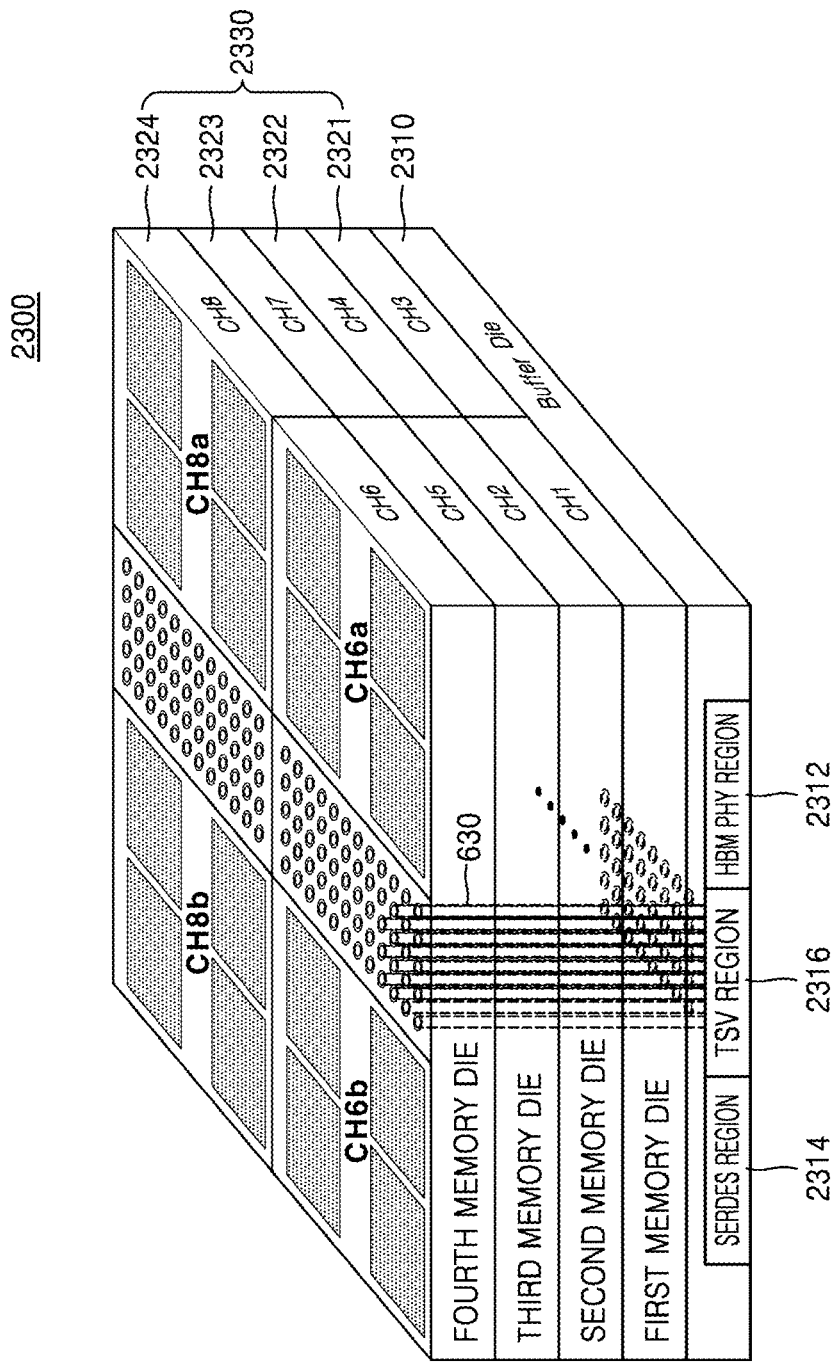

FIGS. 9 and 10 are diagrams for describing an electronic system 2000, according to some example embodiments.

Referring to FIG. 9, the electronic system 2000 may include a system-on-chip (SoC) 2200, an interface device (and/or an interface chip) 2100 to which one or more example embodiments are applied, and/or a semiconductor chip 2300, but the example embodiments are not limited thereto. In some example embodiments, the SoC 2200 may be referred to as a processing device, and the semiconductor chip 2300 may be referred to as a memory device, etc. The SoC 2200 may include an application processor and may function as a host (e.g., a host device, an external device, etc.). The SoC 2200 may include a system bus (not shown) based and/or supporting a protocol having a certain and/or desired standard bus specification and may include various IPs (e.g., IP cores, IP blocks, etc.) connected to the system bus.

A standard specification for the system bus may include an advanced microcontroller bus architecture (AMBA) protocol of Advanced RISC Machine (ARM) Ltd. Bus types of the AMBA protocol may include an advanced high-performance bus (AHB), an advanced peripheral bus (APB), an advanced extensible interface (AXI), AXI4, and AXI coherency extensions (ACE), etc., but is not limited thereto. Besides the above, other types of protocols such as uNetwork of SONICs Inc., CoreConnect of IBM, and open core protocol of OCP-IP's may be used.

The configuration of the semiconductor chip 2300 will be described with reference to FIG. 10. The semiconductor chip 2300 may include high bandwidth memory (HBM) including, e.g., first through eighth channels CH1 through CH8, etc., each having an independent interface, but is not limited thereto. The semiconductor chip 2300 may include a plurality of dies, e.g., a buffer die 2310 and a plurality of memory dies 2320 stacked on the buffer die 2310, etc. For example, a first memory die 2321 may include the first channel CH1 and the third channel CH3, a second memory die 2322 may include the second channel CH2 and the fourth channel CH4, a third memory die 2323 may include the fifth channel CH5 and the seventh channel CH7, and a fourth memory die 2324 may include the sixth channel CH6 and the eighth channel CH8, but the example embodiments are not limited thereto.

The buffer die 2310 may be connected to the interface device 2100 through conductive members, e.g., bumps or solder balls, formed on the outer surface of the semiconductor chip 2300, but is not limited thereto. The buffer die 2310 may receive a command, an address, and/or data from the SoC 2200 through the interface device 2100 and may provide the command, the address, and/or the data to at least one of the first through eighth channels CH1 through CH8 of the memory dies 2320. The buffer die 2310 may provide data, which is output from at least one of the first through eighth channels CH1 through CH8 of the memory dies 2320, to the SoC 2200 through the interface device 2100.

The semiconductor chip 2300 may include a plurality of through silicon vias (TSVs) 2330 passing through the memory dies 2320, but is not limited thereto. Each of the first through eighth channels CH1 through CH8 may be separated to the left and right sides, but are not limited thereto. For example, the sixth channel CH6 of the fourth memory die 2324 may be separated into pseudo channels CH6$a$ and CH6$b$, and the eighth channel CH8 of the fourth memory die 2324 may be separated into pseudo channels CH8$a$ and CH8$b$, etc. The TSVs 2330 may be between the pseudo channels CH6$a$ and CH6$b$ of the sixth channel CH6 and between the pseudo channels CH8$a$ and CH8$b$ of the eighth channel CH8, etc.

The buffer die 2310 may include a TSV region 2316, a SERDES region 2314, and/or an HBM physical layer (PHY) interface, e.g., an HBM PHY region 2312, etc. The TSVs 2330 for communication with the memory dies 2320 are formed in the TSV region 2316.

With the increase of the processing throughput of the SoC 2200 and the increasing desire and/or demand for memory bandwidths, the SERDES region 2314 provides an SERDES interface according to Joint Electron Device Engineering Council (JEDEC) standards, but the example embodiments are not limited thereto. The SERDES region 2314 may include a SERDES transmitter part (e.g., circuitry, device, module, etc.), a SERDES receiver part (e.g., circuitry, device, module, etc.), and/or a controller part (e.g., circuitry, device, module, etc.). The SERDES transmitter part may include a parallel-to-serial circuit and a transmitter and may receive and serialize a parallel data stream, but is not limited thereto. The SERDES receiver part may include a receiver amplifier, an equalizer, a clock and data recovery (CDR) circuit, and/or a serial-to-parallel circuit, etc., and may receive and parallelize a serial data stream, but is not limited thereto. The controller part may include an error detection circuit, an error correction circuit, and/or registers such as first-in, first-out (FIFO) registers, but is not limited thereto.

The HBM PHY region 2312 may include a physical or an electrical layer, and a logical layer, which are provided for signals, frequency, timing, driving, detailed operation parameters, and/or functionality, and may be desired and/or required for efficient communication between the SoC 2200 and the semiconductor chip 2300, etc. The HBM PHY region 2312 may perform memory interfacing such as selecting a row and a column corresponding to a memory cell, writing data to a memory cell, and/or reading data from a memory cell, etc. The HBM PHY region 2312 may support features of an HBM protocol defined by JEDEC, but is not limited thereto.

The interface device 2100 may include an equalizer according to some example embodiments. The interface device 2100 may equalize and transmit a data signal from the SoC 2200 to the semiconductor chip 2300 and/or may equalize and transmit a data signal from the semiconductor chip 2300 to the SoC 2200, etc.

The interface device 2100 may interface such that data communication between the SoC 2200 and the semiconductor chip 2300 may be performed smoothly. According to some example embodiments, the interface device 2100 may have a broad operating frequency bandwidth and may perform interfacing which matches the fast data communication between the SoC 2200 and the semiconductor chip 2300, etc.

Figure 11:
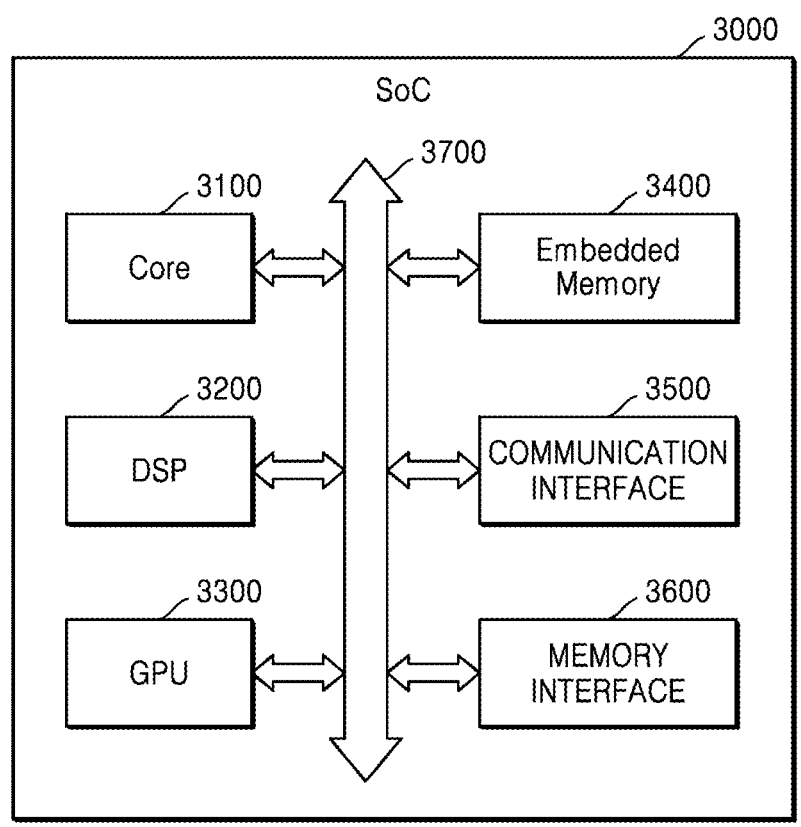
FIG. 11 is a block diagram of a system-on-chip (SoC) according to at least one example embodiment.

FIG. 11 is a block diagram of an SoC 3000 according to at least one example embodiment. An SoC may refer to an integrated circuit, into which components of a computing system or another electronic system are integrated. For example, an application processor (AP) as an SoC may include at least one processor (e.g., at least one processor core, etc.) and/or other components for other functions, etc.

Referring to FIG. 11, the SoC 3000 may include a core 3100, a digital display processor (DSP) 3200, a graphics processing unit (GPU) 3300, an embedded memory 3400, a communication interface 3500, and/or a memory interface 3600, etc., but is not limited thereto. Elements of the SoC 3000 may communicate with each other through a bus 3700, but is not limited thereto.

The core 3100 may process instructions and control operations of elements of the SoC 3000. For example, the core 3100 may drive and/or execute an operating system and may execute applications on the operating system, by processing a series of instructions (e.g., computer readable instructions, etc.). The DSP 3200 may generate useful data by processing digital signals, e.g., digital signals provided from the communication interface 3500. The GPU 3300 may generate data for images, which are output through a display device, from image data provided from the embedded memory 3400 and/or the memory interface 3600, and may encode the image data. The embedded memory 3400 may store data for the operations of the core 3100, the DSP 3200, and/or the GPU 3300, etc. The memory interface 3600 may provide an interface for an external memory of the SoC 3000, e.g., dynamic random access memory (DRAM) or flash memory, but is not limited thereto.

The communication interface 3500 may provide serial communication with the outside (e.g., an external destination) of the SoC 3000. For example, the communication interface 3500 may access Ethernet and include a SERDES for serial communication, etc.

An equalizer according to some example embodiments may be applied to the communication interface 3500 and/or the memory interface 3600. In detail, the communication interface 3500 and/or the memory interface 3600 may equalize data in various modes using various configurations and methods, according to some example embodiments.

While various example embodiments of the inventive concepts have been particularly shown and described, it will be understood that various changes in form and details may be made therein without departing from the spirit and scope of the following claims.

What is claimed is:

1. A device comprising:
a receiver analog front-end circuit including a path shared by an internal loopback current path and a calibration current path,
wherein the receiver analog front-end circuit is configured to perform an internal test using the internal loopback current path in a test mode, and equalize a first data signal in a normal mode, equalizing the first data signal including removing an offset from the first data signal using the calibration current path, and
wherein the path includes a plurality of first transistors, and each first transistor of the plurality of first transistors is configured to,
receive internal test data through a respective gate terminal of the first transistor in the test mode, and
receive offset data through the respective gate terminal of the first transistor in the normal mode.

2. The device of claim 1, wherein the receiver analog front-end circuit is further configured to selectively transmit one of the internal test data or the offset data to the plurality of first transistors based on a mode selection signal.

3. The device of claim 1, wherein the receiver analog front-end circuit further includes:
a continuous time linear equalizer (CTLE); and
the path is included in the CTLE, and
the CTLE is configured to output the first data signal.

4. The device of claim 3, wherein the CTLE includes:
a high-frequency filter circuit;
a fixed gain amplifier circuit configured to receive a plurality of first inputs from the high-frequency filter circuit; and
a variable gain amplifier circuit configured to receive a plurality of second inputs from the fixed gain amplifier circuit,
wherein the path is included in the fixed gain amplifier circuit, and
the variable gain amplifier circuit is further configured to output the first data signal.

5. The device of claim 4, wherein the high-frequency filter circuit is configured to be deactivated in response to the receiver analog front-end circuit being in the test mode, and to be activated in response to the receiver analog front-end circuit being in the normal mode.

6. The device of claim 4, wherein the fixed gain amplifier circuit includes:
a first current source configured to amplify the plurality of first inputs and output a first current;
a second current source configured to remove the offset from the output of the CTLE and output a second current; and
a plurality of second transistors,
wherein each of the plurality of second transistors is configured to be turned on based on the receiver analog front-end circuit being in the test mode and turned off based on the receiver analog front-end circuit being in the normal mode,
wherein the receiver analog front-end circuit is further configured to sum the first current and the second current and transmit results of the summing through the path in the test mode, and transmit only the second current through the path in the normal mode.

7. The device of claim 6, wherein the receiver analog front-end circuit is further configured to:
transmit the first current and the second current through the internal loopback current path in the test mode; and transmit the second current through the calibration current path in the normal mode.

8. The device of claim 1, further comprising:
a serializer/deserializer (SERDES) circuit configured to parallelize the equalized first data signal received from the receiver analog front-end circuit, or serialize and transmit a second data signal to a transmitter driver circuit, and
wherein the internal loopback current path is included in the SERDES circuit and the receiver analog front-end circuit.

9. The device of claim 1, further comprising a controller configured to control the receiver analog front-end circuit to operate in one of the test mode or the normal mode.

10. The device of claim 1, further comprising:
a transmitter driver circuit configured to transmit a second data signal to an external destination based on the receive analog front-end circuit being in the normal mode, and is configured to be deactivated based on the receiver analog front-end circuit being in the test mode.

11. A device comprising:
a receiver analog front-end circuit configured to equalize a first data signal;
a transmitter driver circuit configured to transmit a second data signal to an external destination;
a serializer/deserializer (SERDES) circuit configured to parallelize the equalized first data signal provided from the receiver analog front-end circuit, or serialize and provide the second data signal to the transmitter driver circuit; and
a controller configured to control the receiver analog front-end circuit and the SERDES circuit to enable one of an internal loopback current path or a calibration current path,
wherein
the receiver analog front-end circuit is further configured to use the internal loopback current path to test the receiver analog front-end circuit and the SERDES circuit in a test mode, and use the calibration current path to equalize the first data signal by removing an offset from the first data signal in a normal mode,
wherein the receiver analog front-end circuit includes a plurality of first transistors corresponding to a path shared between the internal loopback current path and the calibration current path, and
wherein each first transistor of the plurality of first transistors is configured to,
receive internal test data through a respective gate terminal of the first transistor in the test mode, and
receive offset data through the respective gate terminal of the first transistor in the normal mode.

12. The device of claim 11, wherein the controller is further configured to:
control transmission of the offset data to the gate terminal of each first transistor of the plurality of first transistors based on the receiver analog front-end circuit being in the test mode; and
control transmission of the internal test data to the gate terminal of each first transistor of the plurality of first transistors based on the receiver analog front-end circuit being in the normal mode.

13. The device of claim 12, wherein
the controller is further configured to provide a mode selection signal to the receiver analog front-end circuit; and
the receiver analog front-end circuit is further configured to selectively provide one of the internal test data or the offset data to the gate terminal of each first transistor of the plurality of first transistors based on the mode selection signal.

14. The device of claim 13, wherein the receiver analog front-end circuit further includes:
a third transistor configured to receive the mode selection signal through a gate terminal of the third transistor, and selectively output the internal test data in response to the mode selection signal; and
a fourth transistor configured to receive an inverted signal of the mode selection signal through a gate terminal of the third transistor, and selectively output the offset data in response to the inverted signal.

15. The device of claim 11, wherein the receiver analog front-end circuit further includes:
a continuous time linear equalizer (CTLE), the CTLE including the plurality of first transistors, and
the CTLE is configured to output the first data signal as a positive output signal and a negative output signal.

16. The device of claim 15, wherein the CTLE includes:
a first current source configured to output a first current;
a second current source configured to output a second current; and
a plurality of second transistors,
wherein the controller is further configured to,
generate a mode selection signal at a first voltage level, and transmit the mode selection signal to a gate terminal of each second transistor of the plurality of second transistors based on the receiver analog front-end circuit being in the test mode, the mode selection signal at the first voltage level turning on the plurality of second transistors, and
generate the mode selection signal at a second voltage level, and transmit the mode selection signal to the gate terminal of each second transistor of the plurality of second transistors, the mode selection signal at the second voltage level turning off the plurality of second transistors, and
wherein the receiver analog front-end circuit is further configured to receive the first current and the second current through the path in the test mode, and receive only the second current through the path in the normal mode.

17. A continuous time linear equalizer (CTLE) comprising:
a high-frequency filter circuit configured to receive a first positive input and a first negative input, and output a positive selection input and a negative selection input based on the first positive input and the first negative input;
a fixed gain amplifier circuit configured to receive a second positive input, a second negative input, the positive selection input, and the negative selection input from the high-frequency filter circuit; and
a variable gain amplifier circuit configured to receive a third positive input and a third negative input from the fixed gain amplifier circuit,
wherein the fixed gain amplifier circuit includes:
a first current source configured to amplify the second positive input or the second negative input;
a second current source configured to remove an offset from the third positive input and the third negative input;
a plurality of first transistors configured to form a first path from the first current source in response to the second positive input or the second negative input;

a plurality of second transistors configured to form a second path from the second current source in response to the positive selection input or the negative selection input; and a plurality of third transistors configured to generate a third path from the first current source in response to a mode selection signal, and wherein the positive selection input and the negative selection input correspond to internal test data based on the CTLE being in a test mode and correspond to offset data based on the CTLE being in a normal mode.

18. The CTLE of claim 17, wherein the first transistors are configured to be turned off based on the CTLE being in the test mode;

the second and third transistors are configured to be turned on based on the CTLE being in the test mode;

an internal loopback current path including the second and third paths is enabled based on the CTLE being in the test mode;

the third transistors are configured to be turned off based on the CTLE being in the normal mode;

the first and second transistors are configured to be turned on based on the CTLE being in the normal mode; and a calibration current path including the first and second paths is enabled based on the CTLE being in the normal mode.

19. The CTLE of claim 17, wherein the high-frequency filter circuit includes a plurality of fourth transistors each configured to receive the first positive input or the first negative input through a respective gate terminal, and in response to the CTLE being in the test mode, the plurality of fourth transistors are configured to turn off based on values of the first positive input and the first negative input.

* * * * *